United States Patent
Will

[11] 3,833,420
[45] Sept. 3, 1974

[54] BATTERY CASING AND REGENERATIVE METAL-WATER BATTERY

[75] Inventor: Fritz G. Will, Scotia, N.Y.

[73] Assignee: General Electric Company, Schenectady, N.Y.

[22] Filed: Apr. 20, 1972

[21] Appl. No.: 245,840

[52] U.S. Cl............................ 136/6 R, 136/6 F
[51] Int. Cl. .................................. H01m 35/00
[58] Field of Search ............... 136/6, 83, 20, 86

[56] References Cited
UNITED STATES PATENTS

| | | | |
|---|---|---|---|
| 2,102,701 | 12/1937 | Gyuris............................ | 136/83 R |
| 3,245,836 | 4/1966 | Agruss........................... | 136/86 A |
| 3,404,035 | 10/1968 | Kummer et al.................. | 136/6 FS |
| 3,455,744 | 7/1969 | Werth et al..................... | 136/86 A |
| 3,533,848 | 10/1970 | Winn.............................. | 136/6 F |
| 3,535,163 | 10/1970 | Dzieciuch et al............... | 136/6 FS |
| 3,554,806 | 1/1971 | Greenberg et al.............. | 136/83 T |
| 3,607,405 | 9/1971 | Christopher.................... | 136/20 |
| 3,607,417 | 9/1971 | McRae et al................... | 136/86 |
| 3,679,480 | 7/1972 | Brown et al.................... | 136/6 FS |

Primary Examiner—Winston A. Douglas
Assistant Examiner—C. F. Lefevour
Attorney, Agent, or Firm—Paul R. Webb II; Joseph T. Cohen; Jerome C. Squillaro

[57] ABSTRACT

A battery casing is disclosed which includes a reservoir in sealed communication with an inner vessel of a solid crystalline ion-conductive material, an outer vessel surrounds the inner vessel and defining therewith a narrow fluid passageway, and a fluid storage and circulating system for providing fluid flow through the passage. A regenerative metal-water battery has the above type of casing with a sodium or potassium anode in the inner vessel and water as the oxidant in the outer vessel.

4 Claims, 1 Drawing Figure

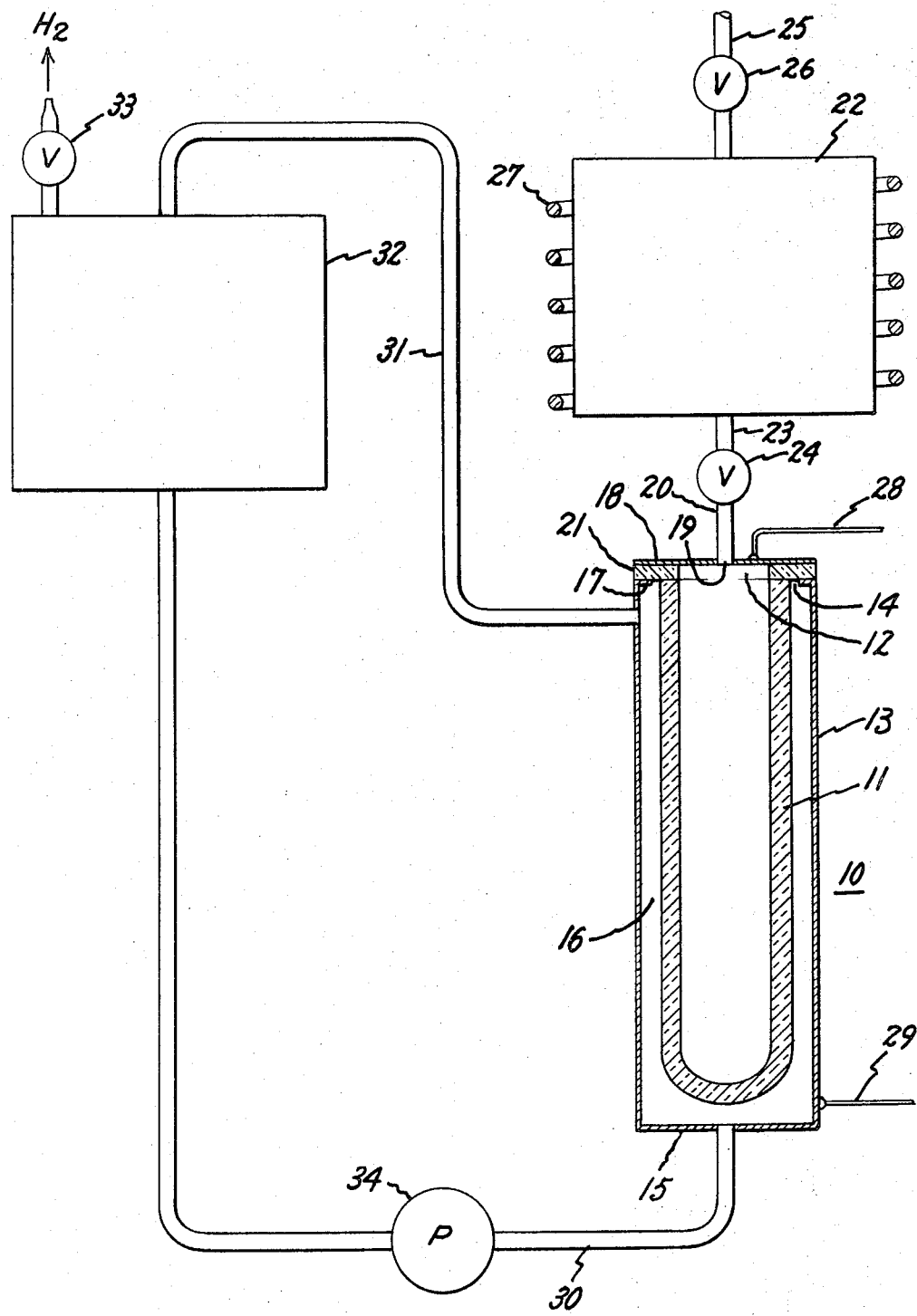

BATTERY CASING AND REGENERATIVE METAL-WATER BATTERY

This invention relates to battery casings and to regenerative batteries and, more particularly, to such battery casings and to batteries employing an anode of metallic sodium or potassium, a solid sodium or potassium ion-conductive electrolyte, and a water oxidant.

Sodium-sulfur cells, which operate at elevated temperatures, are known in the prior art as, for example, described in Kummer et al, Pat. No. 3,404,036 issued Oct. 1, 1968 under the title "Energy Conversion Device Comprising a Solid Crystalline Electrolyte and a Solid Reaction Zone Separator". The solid crystalline ion-conductive electrolyte in the above-mentioned sodium sulfur battery can be sodium beta-alumina.

Sodium amalgam-oxygen fuel cells are known in the prior art as, for example, described in Eidensohn Pat. No. 3,057,946 issued Oct. 9, 1962 under the title "Fuel Cell System". A sodium amalgam is flowed over the face of a metallic plate within an aqueous solution of sodium hydroxide to provide the anode. An oxygen diffusion electrode within the same electrolyte provides the cathode.

Sodium reservoirs for batteries employing sodium ion-conductive electrolyte vessels are known in the prior art as, for example, described in Kummer et al, Pat. No. 3,413,150, issued Nov. 26, 1968. In the upper portion of the battery there is a chamber wherein one or more reservoirs which contain molten sodium are connected to sodium ion-conductive vessels. On the opposite side of such vessels are conductive fiber sheets impregnated with cathodic reaction electrolyte.

In copending patent application Ser. No. 148,791 filed June 1, 1971, now U.S. Pat. No. 3,703,415, entitled "Primary Sodium-Water Battery" in the names of Stephan P. Mitoff and Fritz G. Will, there is described a battery employing sodium amalgam or sodium in an organic electrolyte as the anode and water as the cathode for operation at temperatures between 21.5 and 100°C.

In copending patent application Ser. No. 245,841 filed Apr. 20, 1972 filed concurrently herewith in the name of Fritz G. Will and entitled "Regenerative Metal-Water Battery", there is described and claimed a battery employing a metallic sodium or potassium anode, a water oxidant, and a sodium or potassium reservoir. Both of the above copending patent applications are assigned to the same assignee as the present application.

My present invention is directed to providing a regenerative metal-water battery operable at a moderate temperature of at least the melting point of the metal which battery eliminates the need for electrical charging while employing low-cost reactants.

The primary objects of my invention are to provide a safe moderate temperature battery which has a zero self-discharge rate, high cell voltage and high energy density.

In accordance with one aspect of my invention a regenerative metal-water battery includes a reservoir in sealed communication with an inner vessel of a solid sodium or potassium ion-conductive material, metallic sodium or potassium in the reservoir, means for heating the metal, the metal adapted to provide an anode in the inner vessel, an outer vessel surrounding the inner vessel and defining therewith a narrow fluid passageway, and an aqueous fluid storage and circulating system for providing fluid flow through the passageway.

These and various other objects, features and advantages of the invention will be better understood from the following description taken in connection with the accompanying drawing in which:

The single FIGURE of the drawing is a partial sectional view of a battery casing made in accordance with my invention.

In the single FIGURE of the drawing, there is shown generally at 10 a battery casing embodying my invention which has an inner vessel of a solid crystalline ion-conductive material 11 with one open end 12. An outer metallic vessel 13 has an open end 14 and an opposite closed end 15 which vessel surrounds and is spaced from inner vessel 11 and defining therewith a narrow fluid passageway 16. Outer metallic vessel 13 functions as an electronic conductor. An inwardly extending flange 17 is affixed to metallic vessel 13 at its open end 14. Metallic vessel 13 surrounds inner vessel 11 with the exterior surface of flange 17 flush with the surface of the open end 12 of inner vessel 11. A metallic cover 18 has an opening 19 disposed therein. A metallic fill tube 20 is sealed to cover 16 and communicates with opening 19 therein. Cover 18 closes open end 14 of metallic vessel 13 and functions as an electronic conductor for inner vessel 11. An alkali metal and hydroxide resistant glass 21 seals cover 18 to the exterior surface of flange 17 and the upper surface of inner vessel 11.

A first reservoir 22 is in sealed communication with the open end of the inner vessel by being connected to fill tube 20 by means of an outlet tube 23 regulated a manual or automatic valve 24. An inlet tube 25 provided with a valve 26 is shown to fill reservoir 22. Means 27 for heating reservoir 22 are shown in the form of heating coils surrounding reservoir 22. Such heating means include also, for example, heating coils surrounding the remaining portion of the battery casing. Electrical leads 28 and 29 are in electronic connection with the respective electronic conductors.

An inlet line 30 is connected to outer vessel 13 and communicates with narrow fluid passageway 16. An outlet line 31 is connected to outer vessel 13 and communicates with narrow fluid passageway 16. A second reservoir 32 with an appropriate gas vent 33 is connected respectively to inlet and outlet lines 30 and 31. Means for pumping a fluid through lines 30 and 31 and passageway 16 are shown in the form of a circulating pump 34 interposed in inlet line 30. The resulting structure is a battery casing employable advantageously for a regenerative metal-water battery.

I found that I could form a battery casing by positioning an inner vessel of a crystalline ion-conducting material within an outer vessel of a suitable, chemically stable material such as nickel, Kovar alloy, iron or steel with an open end and an opposite closed end. The solid crystalline ion-conductive materials include various ion-conductive materials with oxides of sodium, lithium and potassium having ion-conductivity or mixtures of these oxides. The outer and inner vessels are spaced apart and define a narrow fluid passageway therebetween. Such a narrow fluid passageway is desirable from a safety standpoint in view of the types of reactants which are used in such a casing.

The outer metallic vessel has an inwardly extending flange affixed to its open end. The inner and outer vessels are aligned so that the exterior surface of the flange is flush with the surface of the open end of the other vessel. A washer of a suitable sodium resistant glass, such as Corning Glass No. 7056, General Electric Company Glass No. 1013, Sovirel Glass No. 747, or Kimble Glass No. N-51A is positioned on the upper surfaces of the open end of the inner vessel and the exterior flange of the outer vessel. A metallic cover of a suitable, chemically stable metal made of nickel, Kovar alloy, iron or steel with a centrally disposed opening therein has extended therefrom a metallic fill tube of the same metal. The cover and fill tube can be a unitary structure or separate parts which are sealed together, for example, by welding. The cover is positioned on the opposite surface of the glass washer. The glass washer is then heated to a temperature of 1000°C in a furnace whereby the cover is sealed by the glass to the upper ends of the inner casing and the exterior surface of the flange. The metallic cover functions as an electronic conductor associated with the inner vessel. If a nonmetallic cover is employed an electronic conductor is provided within the inner vessel in the form of a metal wire of nickel or Kovar alloy affixed to a metallic portion in the cover or fill tube, or extended outside the battery casing. Electrical leads are attached to exterior portions of the battery casing so that each lead is connected to its respective electronic conductor.

A reservoir or container of a suitable chemically stable metal made of niobium, Kovar alloy or tantalum is in sealed communication with the open end of the inner vessel by being connected by an outlet tube to the cover fill tube. A flow valve, which can be operated manually or automatically is interposed preferably between the outlet tube and the fill tube. An inlet tube with a valve is provided also for the reservoir. Means are provided for heating the first reservoir or the entire casing. A heating coil surrounding the reservoir or the entire battery casing is one means of heating. An inlet line and an outlet line are connected to the outer vessel and communicate with the narrow fluid passageway formed between the inner and outer vessels. A second reservoir with an appropriate gas vent is connected respectively to the inlet and outlet lines. Means for pumping a fluid through the inlet and outlet lines, and narrow passage is provided in the form of a circulating pump interposed in the inlet line.

I found that I could form a regenerative metal-water battery by employing the above-described battery casing. Such a battery has an open circuit voltage of 1.9 volts and a theoretical energy density of 450 watt hours per pound. The solid crystalline ion-conductive materials for the inner vessel of the battery is a solid sodium or potassium containing ion-conductive material. "Sodium or potassium containing" defines sodium ion or potassium ion conductivity. The anode is metallic sodium or potassium which is transferred preferably in liquid state through the inlet tube into the reservoir, inner vessel and connecting tubes. The cathode comprises an aqueous solution as sole oxidant which is a dilute aqueous solution of alkali hydroxide, alkali chloride or other common salts. A preferred concentration range for the electrolyte is between 1 to 10% by weight of the aqueous solution. The solution is transferred preferably through the fill aperture in the reservoir after which the gas vent valve is reinserted in the fill aperture. In this manner the reservoir and a portion of the inlet tube is filled. During filling with aqueous solution, the pump can be operated to fill both lines and the narrow passageway. The narrow fluid passageway has a preferred width in the range of a few tenths of a millimeter to a few millimeters. For a single cell battery with a power output of 1 watt preferred fluid flow rates are between 1 and 10 cm$^3$/min. The required flow rate for multi-cell battery arrangements depends on the particular design of the battery and the heat exchanger.

The battery can be heated to an operating temperature above the melting temperature of the metal, i.e. approximately 100°C for sodium, by employing a heating coil around the battery casing. Alternately, the battery can be short circuited initially before fluid pumping is initiated to provide the above operating temperature. Any excess heat during operation can be removed in any suitable manner. During battery operation, water is consumed, alkali hydroxide is formed and hydrogen is evolved. The resulting structure is a regenerative metal-water battery.

During operation of the battery, the pump circulates the aqueous solution from the reservoir, through the inlet line, through the narrow fluid passageway, and through outlet line to the reservoir. Additional metal is provided to the inner vessel from the metal reservoir.

The battery can be discharged at least until the alkali hydroxide concentration reaches the solubility limit, i.e. approximately 77% by weight for NaOH at 100°C. At this point in operation, the metal reservoir is empty and only a small residual amount of metal is left in the inner vessel. For continued discharge, the concentrated alkali hydroxide is replaced with a fresh aqueous supply and the alkali container is refilled or replaced with a new reservoir. Since hydrogen gas is also a reaction product, a relief valve is provided in the upper portion of the water reservoir. Any excess heat during operation can be removed in any suitable manner for example, by heat exchangers thereby maintaining the aqueous solution temperature in a desirable range above the melting temperature of the metal and below the boiling point of the aqueous solution. In large systems, the aqueous solution flow can be advantageously adjusted automatically to the electrical power output. For example, this can be accomplished by a bi-metal strip-controlled valve. The above structure results in a regenerative metal-water battery.

Examples of regenerative metal-water batteries are set forth below to show the operation of regenerative batteries employing metal and water reactants.

EXAMPLE I

A regenerative metal-water battery was assembled. A sodium beta-alumina disk which was 1 centimeter in diameter and 1 millimeter thick was sealed to one open end of a glass tube having a length of 10 centimeters to provide an inner vessel. Metallic sodium was added to the tube from a syringe thereby filling a portion of the tube adjacent the interior surface of the beta-alumina disk. A Kovar alloy wire was positioned within the tube adjacent the interior surface of the disk and extended out through the opposite end of the tube which was sealed against the wire. This wire provided the first electronic conductor within the tube and its associated lead outside of the tube for the battery.

A Pyrex glass container was filled substantially with 25% by weight sodium hydroxide solution which container formed an outer vessel which surrounded the beta-alumina disk and a portion of the inner glass tube.

A second electronic conductor in the form of nickel foam was positioned in the sodium-hydroxide solution adjacent to but spaced from the beta-alumina disk. A nickel wire, which was connected to the nickel foam, extended outwardly from the sodium hydroxide solution to provide the second electrical lead. The outer vessel was not provided with a cover closing its upper open end. The resulting structure was a regenerative metal-water battery.

EXAMPLE II

The battery of Example I was raised to a temperature of 115°C by heating the structure in a furnace. At a temperature of 115°C, the open circuit voltage of the battery was 1.68 volts and the following polarization behavior was exhibited as shown below in Table I:

TABLE I

| Current — Milliamperes | Potential — Volts |
| --- | --- |
| 0 | 1.68 |
| 0.16 | 1.55 |
| 0.28 | 1.44 |
| 0.36 | 1.36 |
| 0.52 | 1.24 |
| 0.82 | 0.96 |
| 2.08 | 0.44 |

EXAMPLE III

A regenerative metal-water battery was assembled similar to the battery described above in Example I. However, the beta-alumina disk was held adjacent the inner open end of the glass tube by providing an epoxy layer around the perimeter of the disk and glass tube. Platinum foil which had been platinized was used rather than the nickel foam in Example I. The sodium was introduced into the inner vessel by vacuum distillation. The resulting structure was a regenerative metal-water battery.

EXAMPLE IV

The battery of Example III was raised to a temperature of 123°C. The open circuit voltage of the battery was 1.85 volts and the following polarization behavior was exhibited as shown below in Table II.

TABLE II

| Current — Milliamperes | Potential — Volts |
| --- | --- |
| 0 | 1.85 |
| 1.0 | 1.45 |
| 2.0 | 1.28 |
| 3.0 | 1.13 |
| 4.0 | 0.99 |
| 5.0 | 0.87 |
| 6.0 | 0.75 |
| 7.0 | 0.64 |
| 8.0 | 0.52 |
| 9.0 | 0.45 |
| 10.0 | 0.35 |
| 14.0 | 0.05 |

While other modifications of the invention and variations thereof which may be employed within the scope of the invention have not been described, the invention is intended to include such as may be embraced within the following claims.

What I claim as new and desire to secure by Letters Patent of the United States is:

1. A regenerative metal-water battery comprising an inner vessel of a solid metal ion-conductive material with one open end, the metal selected from the class consisting of sodium and potassium, a first reservoir in sealed communication with the open end of the inner vessel, a metal selected from the class consisting of sodium and potassium in the reservoir, means for heating the metal, the metal adapted to provide the anode in the inner vessel, an outer vessel with an open end surrounding the inner vessel and defining therewith a narrow passageway, a cover closing the open end of the outer vessel, a first electronic conductor associated with the inner vessel, a second electronic conductor associated with the outer vessel, an inlet line connected to the outer vessel, an outlet line connected to the outer vessel, a second reservoir connected to the inlet and outlet lines, a cathode comprising an aqueous solution as sole oxidant in the second reservoir, and means to pump the aqueous solution through the outer vessel.

2. A regenerative metal-water battery as in claim 1, in which the first electronic conductor is a metallic cover closing the open end of the outer vessel and insulated electrically therefrom.

3. A regenerative metal-water battery as in claim 1, in which the first electronic conductor is a metallic wire within the inner vessel.

4. A regenerative metal-water battery as in claim 1, in which the second electronic conductor is a metallic outer vessel.

* * * * *